Aug. 5, 1952  
JOSEPH HURWITZ  
NOW BY JUDICIAL CHANGE OF NAME  
JOSEPH HOWARD  
AUTOMOBILE BODY TILT PREVENTER  
Filed Jan. 4, 1950
2,606,038
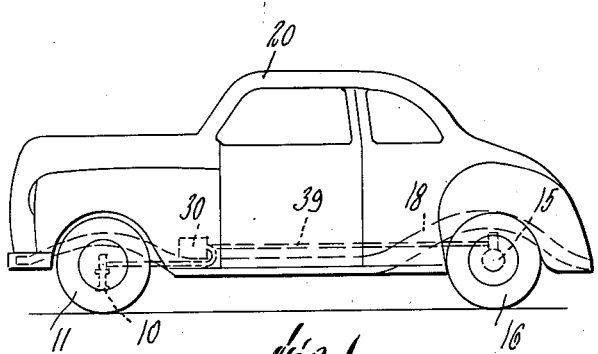
Fig. 1.
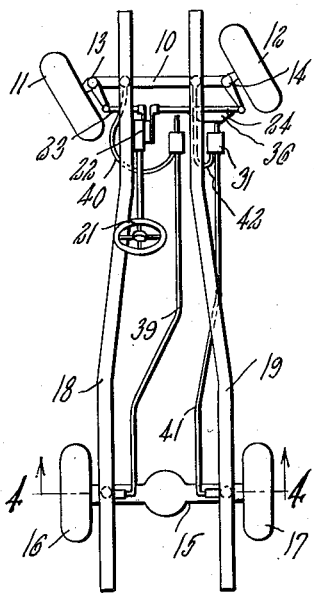
Fig. 2.
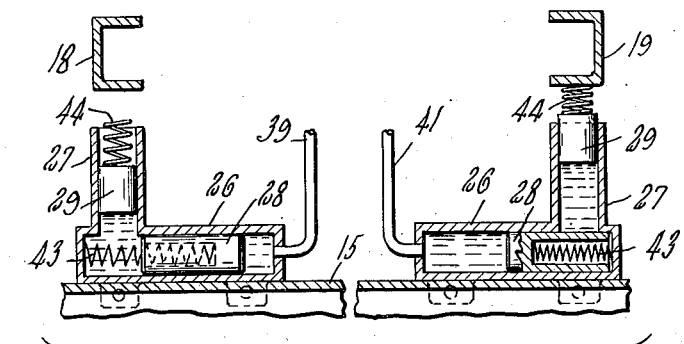
Fig. 3.
Fig. 4.
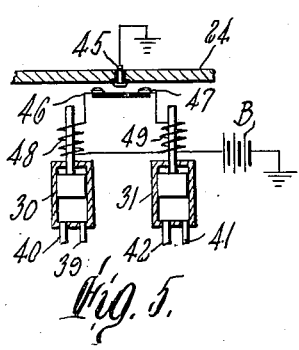
Fig. 5.
INVENTOR  
JOSEPH HURWITZ, NOW  
BY JUDICIAL CHANGE OF  
NAME, JOSEPH HOWARD
by Wright, Brown, Quinby & May  
Attys.

Patented Aug. 5, 1952

2,606,038

UNITED STATES PATENT OFFICE 2,606,038

AUTOMOBILE BODY TILT PREVENTER

Joseph Hurwitz, Brookline, Mass., now by judicial change of name Joseph Howard

Application January 4, 1950, Serial No. 136,750

6 Claims. (Cl. 280—124)

1

The object of the present invention is to provide means for preventing the spring supported body of an automobile from tilting outward when rounding curves. It is a matter of common knowledge that when an automotive vehicle, or any other vehicle for that matter, changes direction in rounding a curve in the road or turning a corner between intersecting streets, centrifugal force tends to tilt the spring supported body toward the outer side of the curve. This tendency is enhanced by the speed of the vehicle and the sharpness of the curve. Tilting of a spring supported body caused thereby shifts the center of gravity outward and augments the tendency of centrifugal force to overturn the vehicle.

It is my present object to prevent, wholly or in large measure, tilting of a spring supported automobile body under such conditions. This object is accomplished by the provision of blocking means between the axles of the under carriage and the frame or chassis which is supported by springs from the axles and to which the engine and load carrying body are secured; such blocking means being inoperative to prevent the free relative up and down movements of wheels and body, and flexing of the springs, in passing over rough roads when the vehicle travels in a substantially straight course, but being controlled by the steering gear to become operative to block relative downward tilting of the body at one side when the steering road wheels are turned to change the direction of progress of the vehicle.

An illustrative embodiment of the invention is described in the following specification with reference to the drawings, in which:

Fig. 1 is a side elevation of a conventional passenger automobile of the sedan type;

Fig. 2 is a plan view of the under carriage construction and side bars of the spring supported chassis of such an automobile, showing application thereto of body tilt preventing means embodying this invention;

Fig. 3 is a diagrammatic sectional view illustrating the principles of the controlling means for the tilt preventing means;

Fig. 4 is a cross section of the rear axle housing of the automobile taken on line 4—4 of Fig. 2 and showing two of the four blocking units by which tilting is prevented;

Fig. 5 is a fragmentary diagrammatic view showing a variation of the primary controlling means.

Like reference characters designate the same

2 parts wherever they occur in all the figures.

The illustration in Figs. 1 and 2 typifies any automotive vehicle having a spring supported body, whether such vehicle is a passenger car, of any design, a truck of any size and weight, or any other. Here 10 represents the front axle on which steering road wheels 11 and 12 are mounted by knuckles 13 and 14; 15 designates the rear axle housing at the end of which driving road wheels 16 and 17 are mounted; and 18 and 19 designate the longitudinal side bars of the chassis which are supported by springs from the front axle and rear axle housing, and on which the load carrying body 20 of the vehicle is mounted. Fig. 2 shows also the steering gear comprising a hand wheel 21, a gearing couple 22 and links 23 and 24 connected with the driven member of the gearing couple 22 and with arms which extend from the knuckles 13 and 14. The structure and mechanism thus far described are standard for one commercial make of automobile and are equivalent to corresponding parts of other makes. They represent and typify the framing and steering means of substantially all automotive, driver guided vehicles.

The tilt preventing means comprises blocking units which are mounted on the front axle and rear axle housing beneath the side bars 18 and 19 near the front and rear ends thereof. Two of such units, thus mounted on the rear axle housing, are shown in Fig. 4. Each includes a horizontal cylinder 26, an upright cylinder 27 in communication with the cylinder 26, and pistons 28 and 29 contained and freely movable in the respective cylinders. The cylinder 26 and all of the cylinder 27 below the piston 29 are filled with oil or other suitable hydraulic liquid. The pistons are fitted closely enough in their cylinders, by means of packing rings or other suitable means, to prevent leakage of the oil past them. The piston 29 of one of the units shown in Fig. 4 is located beneath the bar 18, and the corresponding piston of the other unit is located beneath the bar 19.

Like blocking units, corresponding parts of which are referred to by the same reference numerals in the following description of operation, are mounted on the front axle 10 in similar relation to the forward ends of the bars 18 and 19, respectively. The function of these blocking units is to prevent tilting or sagging down of the body at one side or the other when the automobile turns a corner, and to make no resistance whatever to the normal free springing movement of the body when the automobile travels over a substantially straight road, with no, or slight, changes of direction.

These blocking units are actuated by hydraulic cylinders 30 and 31 under control of the steering mechanism. The control cylinders are mounted on any convenient part of the under carriage of the automobile near to the steering mechanism. They contain pistons 32 and 33, respectively, from which piston rods 34 and 35 project forwardly into position to be engaged and shifted, by means connected to the steering mechanism, when the steering wheels are turned to either side. The means last mentioned is, in the present illustration, a cam or double ended wedge 36 secured to the link 24. Inclined faces 37 and 38 at opposite ends of the cam 36 are adapted to act on the piston rods 34 and 35, respectively. The piston rods are spaced apart approximately equal to the distance between the bases of the cam surfaces 37, 38, and the cam is located with respect to these piston rods so that it occupies a neutral position between them, as indicated by dotted lines in Fig. 3, when the wheels 11 and 12 are directed straight ahead. But when the wheels are turned, even slightly, one or the other of the cam surfaces acts to shift the piston rod with which it is engaged. Thus, if the steering wheels are turned to the left, as represented in Figs. 2 and 3, the cam shifts piston 33, while the piston 32 is unaffected. The direction of shifting is that which causes displacement of oil through the after-mentioned connections.

Cylinder 30 is connected at its end away from the cam by a pipe line 39 with the inner end of the cylinder 26 of the blocking unit on the left hand portion of the rear axle housing; and by a pipe 40 with the corresponding part of the similar blocking unit mounted on the left hand end portion of the front axle. Cylinder 31 is similarly connected by pipes 41 and 42 with the blocking units on the right hand end portions of the rear axle housing and front axle beneath the bar 19.

So long as the cam is in neutral position, the several pistons occupy their withdrawn positions indicated as to the left hand unit shown in Fig. 4 and the actuating piston 32. But when the steering road wheels are turned, the piston 32 or 33 according to the direction of turning, is forcibly displaced. If the turning movement is toward the left, it is the piston 33 which is thus displaced. Oil is then forced through the pipes 41 and 42 to the cylinders 26 of the right hand front and rear blocking units. The pistons 28 in these cylinders at the right hand side of the car are then displaced outward, displacing the oil in the adjoining portions of the intersecting cylinders and raising the pistons 29. At the end of their outward movement, the pistons 28 cross the bottoms of the cylinders 27 and act as valves sealing off the blocking cylinders in blocking position and removing releasing pressure from the corresponding actuating cylinder piston preventing reverse flow of the oil in cylinders 27 and so preventing the pistons 29 from descending.

Conversely, if the steering mechanism is actuated to turn the vehicle to the right, the actuating piston 32 is pushed back with corresponding shifting of the pistons in the blocking units of the left hand side of the car and blocking of the upwardly directed piston 29 in those units. Thus, whether the vehicle is turned to left or right, the body at the outer side of the curve which it then traverses is blocked against downward tilting movement.

Figs. 3 and 4 are diagrammatic to the extent that they show the principles of the apparatus, but are not intended to show exact dimensions and proportions. In the practical mechanical design, the displacement and volume of the actuating pistons and of the valve pistons 28 are sufficient to shift the pistons 29 from their withdrawn inoperative positions to their blocking positions.

In order to release the valve pistons 28 from their blocking positions when the actuating pistons are released by the cam as the vehicle moves out of the curve, I may interpose a spring 43 between each of the pistons 28 and the outer head of the cylinder in which the piston is contained. These springs may be light; they need be only strong enough to start the pistons 28 from their blocking positions when the fluid pressure on their opposite ends is relieved.

In order that the body, when thus blocked at either side, will not be restrained too rigidly and subject to hard shocks from rough places on the road, I may mount springs 44 between the side bars 18, 19 and the pistons 29 of the several units. Such springs may be stiff enough, or otherwise designed, so as not to permit any substantial downward movement of the body, while at the same time being resilient enough to obviate excessive rigidity.

It is not essential that apparatus for accomplishing the objects of this invention be in all respects like the embodiment here shown. Various modifications may be made in, and equivalents substituted for, the organization here shown and the parts thereof. For example, the operation and control may be electrical; and I have shown diagrammatically in Fig. 5 an electrical control means by which the steering mechanism causes blocking means to become operative when the direction of the vehicle is changed.

Here an electrical contact element 45 is mounted on the transmission link 24, or some other convenient movable part of the steering mechanism, and is grounded on the frame. Contact 45 is located between insulated contacts 46 and 47, which are in electrical circuit connection with solenoids or equivalent electromagnetic elements 48 and 49, respectively, the latter being in circuit connection with the non-grounded pole of the battery B of the vehicle. The core of solenoid 48 is engaged with the rod of the piston which operates in cylinder 30 in known manner so that, when energized, it causes the piston to move in the direction which transfers fluid from the cylinder 30 to the blocking units at the left hand side of the car, and solenoid 49 is similarly operatively connected with the piston in the cylinder 31. Contacts 46 and 47 are spaced apart in accordance with the predetermined angle to which the steering wheels shall be turned before the blocking units at one side or the other of the vehicle become operative. They may be adjustable in a manner to cause blocking effect to take place sooner or later in the progress of turning the steering wheels.

In describing the pressure transmission system of this combination as being hydraulic, I have not intended to imply a limitation to the use of oil, water or any other liquid as the working fluid. Air or other gas may also be used in like or equivalent manner, wherefore in the broad interpretation of this specification, the term "hydraulic" is to be construed as including pneumatic working fluid.

Although the drawings do not show the means by which the front axle and rear axle housing are connected and maintained in correct relative positions, it is to be understood that the commercial automobiles represented and typified by the drawings include such means, which are likewise included in the present disclosure by necessary implication.

What I claim is:

1. In an automotive vehicle, the combination with an under carriage including road wheels and a body spring supported from the under carriage, of hydraulic cylinders mounted on the under carriage at points on opposite sides of the center line thereof and spaced apart lengthwise of the body at each side, said cylinders being mounted upright beneath members of the body structure and having pistons movable up and down for blocking the body structure when raised and leaving said structure unimpeded when lowered, an actuating cylinder in fluid connection with all of the before mentioned cylinders at one side of the vehicle, another actuating cylinder in like connection with the before named cylinders at the opposite sides of the vehicle, pistons in said actuating cylinders, and means operated by the steering mechanism for displacing the last named pistons; said means being located clear of both actuator pistons when the steering mechanism is set for travel in a substantially straight course, and being movable to displace one or the other of the actuator pistons exclusively when the steering mechanism is shifted to incline the course of travel to one direction or the opposite direction, each of said actuating cylinder pistons being arranged to block off its blocking cylinder against the escape of fluid therefrom when said actuating piston is at its actuating limit of motion, thereby sealing said blocking cylinder in blocking position and removing the releasing pressure from the corresponding actuating cylinder.

2. In an automobile having an under carriage with axles, road wheels and steering mechanism, and a load carrying body including longitudinal side bars supported by springs from the axles, cylinders mounted on the front axle and rear axle housing beneath each side bar and including upwardly and downwardly movable pistons arranged, when raised, to provide a block against downward movement of that part of the side bar under which it is located, a stiff spring located between each of said pistons and the overlying bar, an actuating cylinder in fluid transmitting connection with both blocking cylinders under one of said bars, a second actuating cylinder in fluid transmitting connection with both blocking cylinders under the other side bar, pistons contained in both actuating cylinders, and means connected with and operated by the steering mechanism arranged to displace the piston of one or the other of said actuating cylinders exclusively, when the steering mechanism is actuated to turn the vehicle to right or left, such displacement of the actuator piston being operative to cause transfer of fluid from the actuating cylinder in which that piston is contained to the blocking cylinders with which the actuating cylinder is connected, each of said actuating cylinder pistons being arranged to block off its blocking cylinder against the escape of fluid therefrom when said actuating piston is at its actuating limit of motion, thereby sealing said blocking cylinder in blocking position and removing the releasing pressure from the corresponding actuating cylinder.

3. In an automotive vehicle having a front axle, a rear axle housing, road wheels, under body connections between the axles, and side bars of a body frame overlying the front axle and rear axle housing and spring-supported thereby; blocking devices mounted on the front axle and rear axle housing under both side bars, each blocking device comprising connected horizontal and vertical hydraulic cylinders and pistons movable therein, the vertical cylinder and its piston being directly under the overlying side bar, and the piston in the horizontal cylinder being movable toward and away from the vertical cylinder and across the lower portion thereof, there being a body of liquid between the two pistons, two actuating cylinders, flow connections leading from each of the actuating cylinders to the horizontal cylinders of both blocking devices at one side of the vehicle, the connections with the cylinders of the blocking devices being at the ends thereof remote from the vertical cylinders, pistons in the actuating cylinders, motion transmitting means connected and operable by the steering mechanism associated with said last named pistons and operably arranged to displace one piston or the other in fluid expelling movement with relation to its respective cylinder when the steering mechanism is operated to change direction of the vehicle to right or left.

4. A means for preventing outward tilting of a spring supported automobile body when rounding curves, comprising upright cylinders mounted on the under carriage structure of the automobile at opposite sides and near the opposite ends of each side beneath side bars of the body structure, pistons movable in said cylinders to and away from the overlying side bars, horizontal cylinders each intersecting the lower end portion of one of the upright cylinders, pistons movable in the horizontal cylinders across and away from the respectively adjoining upright cylinders, there being a body of pressure transmitting liquid between the pistons in each unit of upright and horizontal cylinders, an actuating cylinder, an actuator piston movable therein, liquid conducting connections between said actuating cylinder and the horizontal cylinders at one side of the automobile, a second actuating cylinder, an actuator piston movable therein, liquid conducting connections between the second actuating cylinder and the horizontal cylinders at the opposite side of the automobile, and means operated by the steering mechanism of the automobile arranged to displace one or the other of said actuator pistons in the direction to expel liquid from its cylinder according as the steering mechanism is operated to turn the automobile to right or left respectively.

5. In an automotive vehicle having a front axle, a rear axle housing, road wheels, under body connections between the axles, and side bars of a body frame overlying the front axle and rear axle housing and spring-supported thereby; blocking devices mounted on the front axle and rear axle housing under both side bars, each blocking device comprising connected horizontal and vertical hydraulic cylinders and pistons movable therein, the vertical cylinder and its piston being directly under the overlying side bar, and the piston in the horizontal cylinder being movable toward and away from the vertical cylinder and across the lower portion thereof, there being a body of liquid between the two pistons, two actuating cylinders, flow connections leading from each of the actuating cylinders to the horizontal cylinders of both blocking devices at one side of the vehicle, the connections with the cylinders of the blocking devices being at the ends thereof remote from the vertical cylinders, pistons in the actuating cylinders, motion transmitting means connected and operable by the steering mechanism associated with said last named pistons and operably arranged to displace one piston or the other in fluid expelling movement with relation to its respective cylinder when the steering mechanism is operated to change direction of the vehicle to right or left, each of said actuating cylinder pistons being arranged to block off its blocking cylinder against the escape of fluid therefrom when said actuating piston is at its actuating limit of motion, thereby sealing said blocking cylinder in blocking position and removing the releasing pressure from the corresponding actuating cylinder.

6. A means for preventing outward tilting of a spring supported automobile body when rounding curves, comprising upright cylinders mounted on the under carriage structure of the automobile at opposite sides and near the opposite ends of each side beneath side bars of the body structure, pistons movable in said cylinders to and away from the overlying side bars, horizontal cylinders each intersecting the lower end portion of one of the upright cylinders, pistons movable in the horizontal cylinder across and away from the respectively adjoining upright cylinders, there being a body of pressure transmitting liquid between the pistons in each unit of upright and horizontal cylinders, an actuating cylinder, an actuator piston movable therein, liquid conducting connections between said actuating cylinder and the horizontal cylinders at one side of the automobile, a second actuating cylinder, an actuator piston movable therein, liquid conducting connections between the second actuating cylinder and the horizontal cylinders at the opposite side of the automobile, and means operated by the steering mechanism of the automobile arranged to displace one or the other of said actuator pistons in the direction to expel liquid from its cylinder according as the steering mechanism is operated to turn the automobile to right or left respectively, each of said actuating cylinder pistons being arranged to block off its blocking cylinder against the escape of fluid therefrom when said actuating piston is at its actuating limit of motion, thereby sealing said blocking cylinder in blocking position and removing the releasing pressure from the corresponding actuating cylinder.

JOSEPH HURWITZ.
*Now by judicial change of name Joseph Howard.*

REFERENCES CITED

The following references are of record in the file of this patent:

UNITED STATES PATENTS

| Number    | Name        | Date          |
|-----------|-------------|---------------|
| 2,184,202 | Tschanz     | Dec. 19, 1939 |
| 2,253,190 | Mistral     | Aug. 19, 1941 |
| 2,289,907 | Friedlaender| July 14, 1942 |
| 2,490,719 | Tank        | Dec. 6, 1949  |